US010990831B2

(12) United States Patent
Haberstroh et al.

(10) Patent No.: US 10,990,831 B2
(45) Date of Patent: Apr. 27, 2021

(54) METHOD TO CREATE A VR EVENT BY EVALUATING THIRD PARTY INFORMATION AND RE-PROVIDING THE PROCESSED INFORMATION IN REAL-TIME

(71) Applicant: PCMS Holdings, Inc., Wilmington, DE (US)

(72) Inventors: Max C. Haberstroh, Aachen (DE); Julia Sauer, Aachen (DE); André Pomp, Aachen (DE); Andreas Kirmse, Aachen (DE); Tobias Meisen, Aachen (DE); Frank Hees, Aachen (DE); Sabina Jeschke, Aachen (DE)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/236,015

(22) Filed: Dec. 28, 2018

(65) Prior Publication Data

US 2019/0213423 A1 Jul. 11, 2019

Related U.S. Application Data

(60) Provisional application No. 62/614,149, filed on Jan. 5, 2018.

(51) Int. Cl.
*G06K 9/00* (2006.01)
*H04W 4/021* (2018.01)
(Continued)

(52) U.S. Cl.
CPC ..... *G06K 9/00778* (2013.01); *H04N 21/2187* (2013.01); *H04N 21/21805* (2013.01);
(Continued)

(58) Field of Classification Search
CPC .... G06K 9/00778; H04W 4/38; H04W 4/021; H04N 21/21805
(Continued)

(56) References Cited

U.S. PATENT DOCUMENTS

| 8,131,839 B2 | 3/2012 | Yu |
| 2003/0177111 A1 | 9/2003 | Egendorf |

(Continued)

FOREIGN PATENT DOCUMENTS

| WO | 2015184416 A1 | 12/2015 |
| WO | 2016107965 A1 | 7/2016 |

OTHER PUBLICATIONS

Antonić, A., et. al., "A Mobile Crowd Sensing Ecosystem Enabled by CUPUS: Cloud-Based Publish/Subscribe Middleware for the Internet of Things". Future Generation Computer Systems, 56, (2016), pp. 607-622.

(Continued)

*Primary Examiner* — Amir Shahnami
(74) *Attorney, Agent, or Firm* — Invention Mine LLC

(57) ABSTRACT

Creating a list of available data sources for an event selected by a user, displaying one or more icons as an overlay on a first video stream indicating a position of a camera capturing a second video stream, and displaying a map as an overlay on the first video stream in which the map indicates levels of crowd excitement or other mappable data in different regions of a real world environment captured by the first video stream. Some embodiments may include receiving information indicating a user selection of the second video stream. For some embodiments, the levels of crowd excitement may be generated from sensor data, such as audio, video, or heart rate data collected by sensors at the event.

19 Claims, 12 Drawing Sheets

(51) Int. Cl.
*H04N 21/218* (2011.01)
*H04N 21/41* (2011.01)
*H04N 21/4725* (2011.01)
*H04W 4/38* (2018.01)
*H04N 21/414* (2011.01)
*H04N 21/2187* (2011.01)
*H04N 21/2743* (2011.01)

(52) U.S. Cl.
CPC ..... *H04N 21/2743* (2013.01); *H04N 21/4126* (2013.01); *H04N 21/41407* (2013.01); *H04N 21/4725* (2013.01); *H04W 4/021* (2013.01); *H04W 4/38* (2018.02)

(58) Field of Classification Search
USPC ......................................................... 348/157
See application file for complete search history.

(56) References Cited

U.S. PATENT DOCUMENTS

| | | | | |
|---|---|---|---|---|
| 2007/0022447 | A1* | 1/2007 | Arseneau | G06F 1/1626 725/74 |
| 2008/0084473 | A1* | 4/2008 | Romanowich | H04N 7/181 348/135 |
| 2012/0293548 | A1* | 11/2012 | Perez | G06F 3/012 345/633 |
| 2014/0172489 | A1* | 6/2014 | Goulart | G06Q 10/06312 705/7.22 |
| 2016/0029088 | A1* | 1/2016 | Hutten | G06F 3/048 725/59 |
| 2016/0192009 | A1 | 6/2016 | Sugio | |
| 2018/0007352 | A1* | 1/2018 | Chang | H04N 5/23238 |

OTHER PUBLICATIONS

Oana, J., el al., "Continuous Query Evaluation Over Distributed Sensor Networks." IEEE 26th International conference on Data Engineering (ICDE), (2010), 12 pages.
Oana, J., el al., "Processing Publish/Subscribe Queries Over Distributed Data Streams." Proceedings of the Third ACM International Conference on Distributed Event-Based Systems, Jul. 6-9, 2009, 5 pages.
International Search Report and the Written Opinion of the international Searching Authority for PCT/US2017/017694 dated May 8, 2017, 16 pages.
Guo, B., et. al., "Mobile Crowd Sensing and Computing: The Review of an Emerging Human-Powered Sensing Paradigm". ACM Computing Surveys, vol. 48, No. 1, Aug. 2015, pp. 1-31.
Venkatagiri, S., et. al., "On Demand Retrieval of Crowdsourced Mobile Video". IEEE Sensors Journal, vol. 15, No. 5, May 2015, pp. 2632-2642.
Tang, A. et. al., "#EpicPlay: Crowd-sourcing Sports Video Highlights". Proceedings of the 2012 ACM Annual Conference on Human Factors in Computing Systems, CHI '12, May 5-10, 2012, pp. 1569-1572.
Written Opinion of the International Preliminary Examining Authority for PCT/US17/17694 dated Jan. 24, 2018.
International Preliminary Report on Patentability for PCT/US2017/017694 completed Apr. 24, 2018.
To, H. et. al., "A Server-Assigned Spatial Crowdsourcing Framework". ACM Transactions on Spatial Algorithms and Systems, vol. 1, No. 1, Art. 2, published on Jul. 2015, pp. 1-28.
Steffan, J., et. al., "Scoping in Wireless Sensor Networks: A Position Paper". Proceedings of the 2nd Workshop on Middleware for Pervasive and Ad-hoc Computing, ACM, (2004), pp. 167-171.
Steffan, J., et. al. "Towards Multi-Purpose Wireless Sensor Networks". Proceedings of IEEE Systems Communications, (2005), pp. 336-341.
Everding, T. et. al., "Event Pattern Markup Language (EML)". Open Geospatial Consortium Inc., Version 0.3.0, Reference No. OGC 08-132, Nov. 5, 2008, 58 pages.
Hu, X. et. al., "A Survey on Mobile Social Networks: Applications, Platforms, System Architectures, and Future Research Directions". IEEE Communication Surveys & Tutorials, vol. 17, No. 3, 3rd Quarter 2015, pp. 1557-1581.
Bröring, A., et. al., "New Generation Sensor Web Enablement". Sensors, vol. 11, No. 3, (2011), pp. 2652-2699.
Tong, X., et. al. "A Ubiquitous Publish/Subscribe Platform for Wireless Sensor Networks with Mobile Mules". IEEE 8th International Conference on Distributed Computing in Sensor Systems, (2012), pp. 99-108.
Fisteus, J., et. al., "Ztreamy: A Middleware for Publishing Semantic Streams on the Web". Journal of Web Semantics, Oct. 29, 2013, 11 pages.
Souto, E. et. al., "Mires: A Publish/Subscribe Middleware for Sensor Networks". Personal and Ubiquitous Computing, vol. 10, No. 1, Published online on Oct. 9, 2005, pp. 37-44.
Lally, A., et. al., "WatsonPaths: Scenario-based Question Answering and Inference over Unstructured Information". Artificial Intelligence Magazine, vol. 38, No. 2, Summer 2017, pp. 59-76.

* cited by examiner

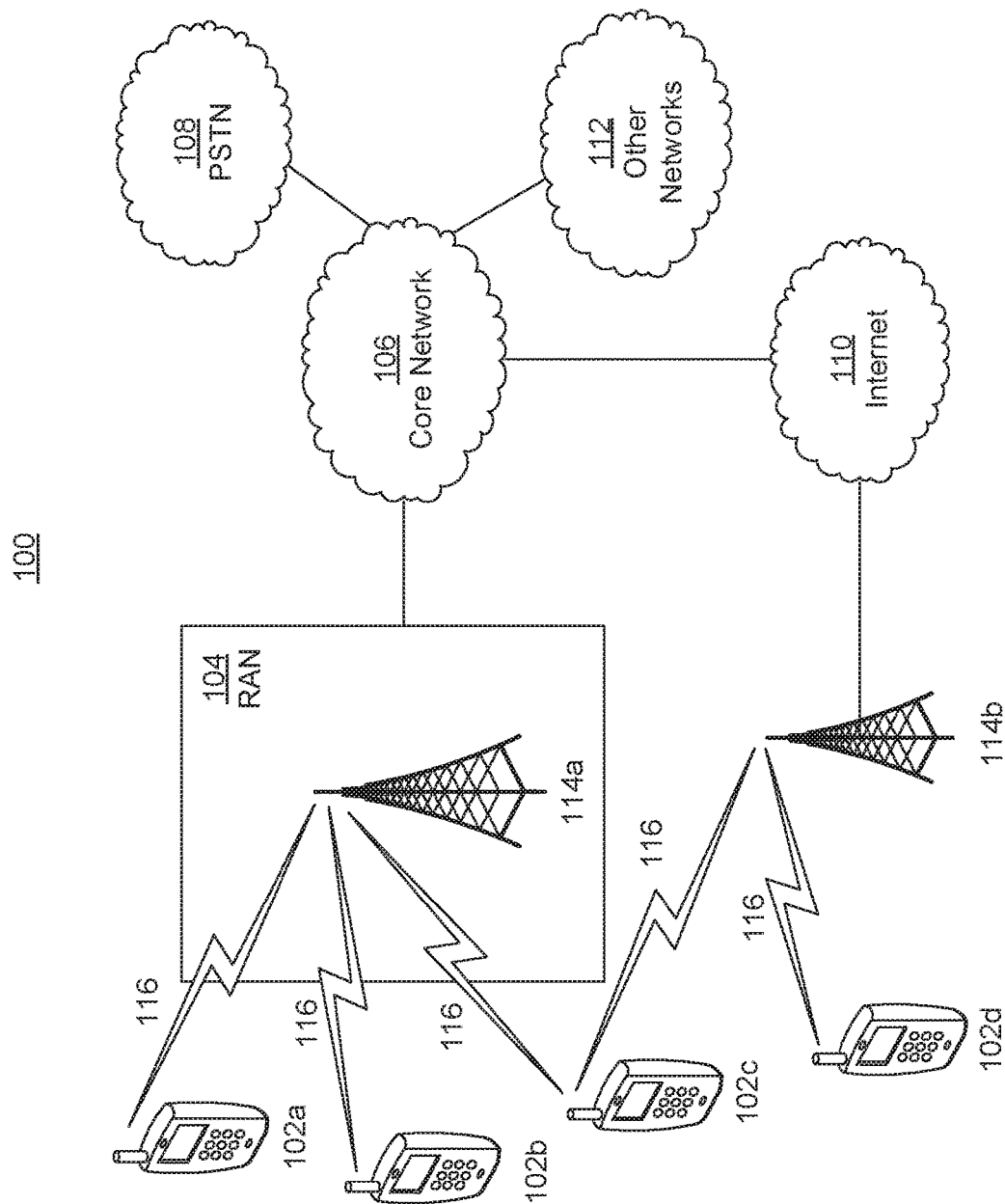

METHOD TO CREATE A VR EVENT BY EVALUATING THIRD PARTY INFORMATION AND RE-PROVIDING THE PROCESSED INFORMATION IN REAL-TIME

CROSS-REFERENCE TO RELATED APPLICATIONS

The present application is a non-provisional filing of, and claims benefit under 35 U.S.C. § 119(e) from, U.S. Provisional Patent Application Ser. No. 62/614,149, entitled "Method to Create a VR Event by Evaluating Third Party Information and Re-Providing the Processed Information in Real-Time," filed Jan. 5, 2018, which is hereby incorporated by reference in its entirety.

BACKGROUND

A data consumer wants to experience first-hand a performance (such as the Pope's speech to a crowd in Philadelphia), but the data consumer is unable to attend due to lack of a ticket. Previously, the data consumer had to rely on news broadcasts and other news sources created by news producers.

News producers generally either obtain information themselves or rely on information provided by press agencies, other news providers, or third-party sources (e.g., social media, or online video websites). The former case requires a substantial amount of effort and resources, since the news producer must be physically present and possess the appropriate equipment to collect or record the information. In the latter case, the news producer has to collect the information from different data sources and carefully examine the third-party material. Moreover, in the run-up to an event, the news producer cannot be sure that the available material will exactly contain the information for which he is looking. In particular, he or she may have little knowledge about the people and technical systems that are going to join a future event, and thus he or she may have little knowledge about the information that will be available.

News producers generally operate their own data sources (e.g., by hiring film crews) and combine those data sources with already-available, third-party information to make an exciting news story. For a day-long event, the news producer is interested in only a small fragment of data available from multiple sources, and the news producer must manage the multiple, different data sources.

A user may watch live video streams using a video streaming application. Such an application may allow a user to provide a live video stream using a smart phone camera. Other users may watch the live video stream and may even communicate with the video provider via a chat function provided by the application. Other users may indicate to the video provider that they like the video stream.

However, communication via chat is very crowded if the number of simultaneous (or nearly simultaneous) communications exceeds a threshold. Most previous video streaming applications allow a user to view video streams chosen to be recorded by a provider.

SUMMARY

Systems and methods disclosed herein generate a virtual reality (VR) environment of an event by processing third-party information and providing processed information in real-time. For one embodiment, an ad-hoc network of actual and virtual sensors may be used to collect, evaluate, and provide data for the VR environment. Actual and virtual sensors are identified and scheduled for data collection and evaluation. Incoming data and user interactions may be continually processed in real-time and a VR environment may be updated.

One exemplary embodiment comprises the following processes. A data consumer device may send a request to an information marketplace to access a VR environment of an event. The request may be processed and analyzed to identify data sources, boundary conditions, as well as data quality and reliability levels for data collection. A VR creator may generate a list of available data sources, associated data source types (or groups), and physical locations of available data sources performing data collection from an event-scheduling database. The VR creator may identify virtual sensors capable of aggregating data from different sensors within a sensor group as well as data from different sensor groups. The VR creator may identify virtual sensors capable of processing data to deliver additional requested information. The VR creator may generate an interactive VR-event map indicating physical locations of data sources and providers. The VR creator may determine an optimal starting position within a VR environment. The user may use VR glasses with a head tracking system (or a head mounted display) and a surround-sound system to follow the event. The user may decide to move to another location for an event, e.g., closer to the stage, because the VR-event map indicates that other locations have a higher excitement level than the excitement level of the user's current location. The user may select a new position by interfacing with the VR-event map. The user may move his or her head to look around the VR environment. A head tracking system may detect the change in orientation and adjust the video (and audio) to be displayed (and heard) from the new orientation. The VR creator may continually analyze incoming data to determine the best fitting data sources for the users current position within the VR environment. At the end of the event, the data consumer device (which may be VR glasses or an HMD) sends a request to log out of the event.

Some embodiments of a method may include: displaying a first video stream of an event captured by a first camera at a first position; displaying an icon as an overlay on the first video stream, with a position of the icon on the display indicating a second position of a second camera capturing a second video stream; and displaying a map as an overlay on the first video stream, wherein the map may indicate different levels of a metric in different regions of the first video stream.

For some embodiments, a method may further include, in response to receiving data indicating user selection of the icon, displaying the second video stream.

For some embodiments, a method may further include receiving data indicating levels of crowd excitement from user devices at the event; and generating the map based on the data indicating levels of crowd excitement, wherein the metric is crowd excitement.

A method may further include, for some embodiments, collecting audio data from a plurality of audio sensors distributed throughout a crowd at the event, wherein the metric is crowd excitement, and wherein levels of crowd excitement may be determined based at least in part on levels of crowd noise indicated by the audio data.

For some embodiments, a method may further include collecting heart rate data from a plurality of heart rate sensors worn by a plurality of participants in a crowd at the event, wherein the metric is crowd excitement, and wherein levels of crowd excitement may be determined based at least in part on heart rate levels indicated by the heart rate data.

A method may further include, for some embodiments, collecting movement data from a plurality of accelerometers worn by a plurality of participants in a crowd at the event, wherein the metric is crowd excitement, and wherein levels of crowd excitement may be determined based at least in part on movement levels indicated by the movement data.

For some embodiments, a method may further include collecting image data from a plurality of image sensors distributed throughout a crowd at the event, wherein the metric is crowd excitement, and wherein the levels of crowd excitement may be determined based at least in part on image detection analysis of the image data.

Some embodiments of a method may include receiving meta data from a plurality of devices distributed throughout a crowd at the event, wherein the metric is determined based at least in part on the meta data. A method may further include, for some embodiments, collecting data from other users' VR devices that are streaming the event, wherein the metric is crowd excitement, and wherein levels of crowd excitement may be determined based at least in part on eye movement and/or pupillometry.

For some embodiments, a method may include displaying the second stream, wherein the first video stream and the second video stream may be displayed as virtual reality displays.

In some embodiments of a method, the first video stream and the second video stream may be live streams of the event.

Some embodiments of a method may include: receiving, from a virtual reality (VR) device, a request corresponding to a virtual view associated with a camera position at a site for an event; and sending, to the VR device, information for rendering the virtual view associated with the camera position at the site for the event, comprising: video information from at least one camera at the camera position, and region information regarding at least one geometric region of the site for the event.

With some embodiments, the region information comprises a metric determined from readings of a sensor associated with each respective geometric region.

In some embodiments, the region information comprises meta data associated with a user located in each respective geometric region.

For some embodiments, the method may further include: rendering a video stream of the virtual view associated with the camera position at the site for the event; generating a map based on the region information; and displaying the map as an overlay on the video stream.

With some embodiments, the method may further include: receiving, from the VR device, a request corresponding to a second virtual view associated with a second camera position at the site for the event; and sending, to the VR device, a second set of information for rendering the second virtual view associated with the second camera position at the site for the event, comprising: video information from at least one camera at the second camera position, and region information regarding at least one geometric region of the site for the event.

Some embodiments of a method may include: displaying, in a virtual reality environment, a video stream of an event captured by a camera at the event; and displaying, as an overlay on the video stream, media metric data of the event captured by one or more sensors, wherein the media metric data may indicate levels of crowd excitement in regions of the video stream.

For some embodiments, displaying media metric data may include: displaying, for each of the one or more sensors, an indication of a location in the virtual reality environment associated with a location at the event of the respective sensor; and displaying, for each of the one or more sensors, an indication of level of crowd excitement at the location at the event of the respective sensor.

A method may further include, for some embodiments, collecting the media metric data from one or more sensors distributed in one or more locations at the event, wherein the media metric data may include audio data captured by at least one of the one or more sensors, and wherein the levels of crowd excitement may be determined based at least in part on levels of crowd noise determined from the audio data.

For some embodiments, a method may further include collecting the media metric data from one or more sensors distributed in one or more locations at the event, wherein the media metric data may include heart rate levels captured by at least one of the one or more sensors, and wherein the levels of crowd excitement may be determined based at least in part on the captured heart rate levels.

A method may further include, for some embodiments, collecting the media metric data from one or more sensors distributed in one or more locations at the event, wherein the media metric data may include movement data captured by at least one of the one or more sensors, and wherein the levels of crowd excitement may be determined based at least in part on the captured movement data.

BRIEF DESCRIPTION OF THE DRAWINGS

A more detailed understanding may be had from the following description, presented by way of example in conjunction with the accompanying drawings. Furthermore, like reference numerals in the figures indicate like elements.

FIG. 1A is a system diagram of an example system illustrating an example communications system according to some embodiments.

Figure 1B:
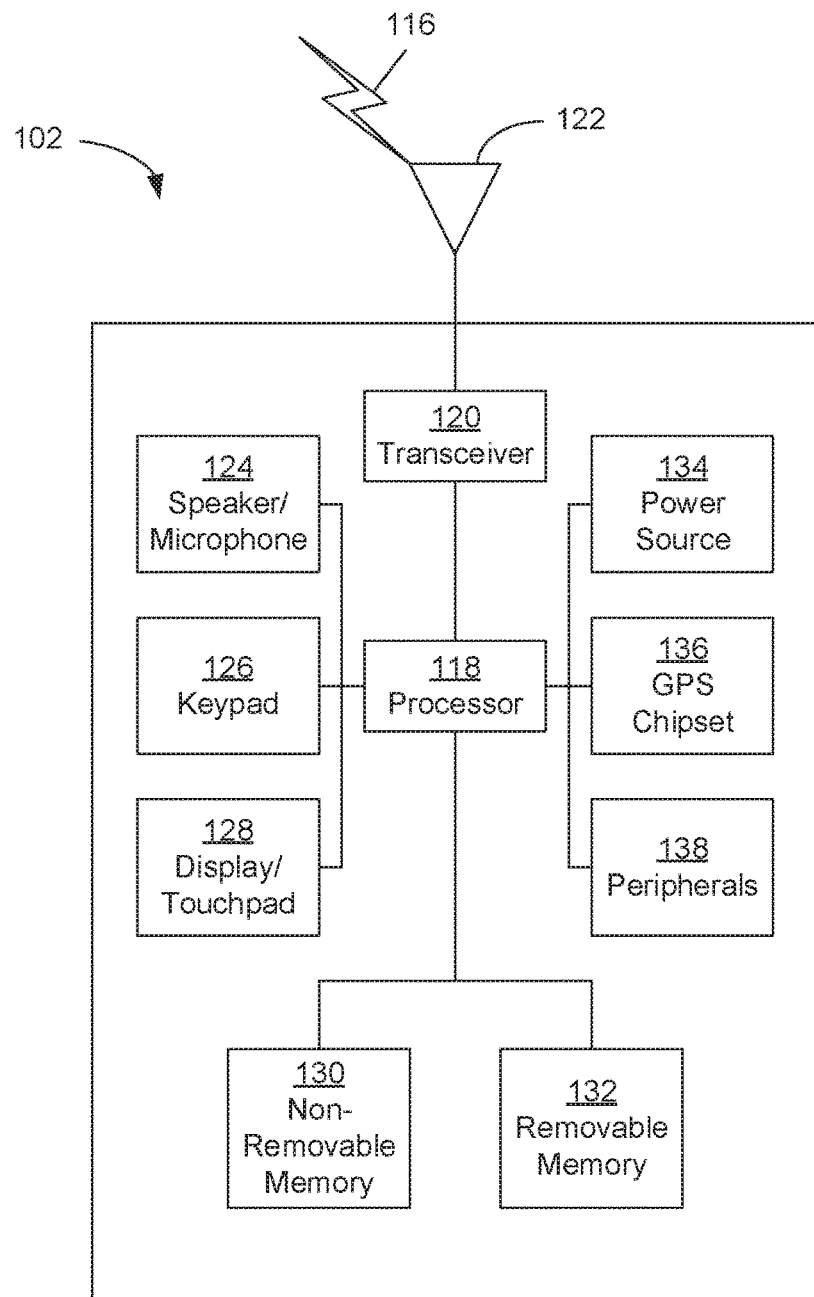
FIG. 1B is a system diagram of an example system illustrating an example wireless transmit/receive unit (WTRU) that may be used within the communications system illustrated in FIG. 1A according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

Example Networks for Implementation of Systems and Methods Described Herein

A wireless transmit/receive unit (WTRU) may be used as a head mounted display (HMD), virtual reality (VR) glasses, or a data consumer user device in embodiments described herein.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Overview

The display of sensor data and meta data may lose utility in highly aggregated spatially distributed sensor information environments. Geo-spatially oriented sensor data visualizations historically are not good at presenting data that is informational to navigating the visualization experience. Many existing means of moving between various crowd sourced video streams forces the user to exit the experience or lack a qualitative means of deciding from where to view a video source, other than video quality or comments/ratings from other viewers.

Systems and methods disclosed herein allow users to participate in events using VR based on data from several data providers instead of a single data provider recording an event. For one embodiment, a system identifies third-party data sources. Collected data is evaluated in real-time, and processed information is sent to a VR device to be viewed by the user. Additional information, such as excitement level of a crowd, may be displayed to the user.

Data from a network of actual and virtual sensors may be collected, evaluated, and processed to provide data for a VR environment of an event. A data and information marketplace may handle data from Internet of Things (IoT) data sources to bring together data providers and data consumers and to offer data integration, exploration, and aggregation services. A virtual reality (VR) creator process may generate VR experiences for events. A VR creator also may handle user interactions with a VR environment for an event and control real-time data collection for an event.

Systems and methods disclosed herein enable a data consumer to visit an event without being physically present at the location of the event. The method may ensure availability and quality of requested information by identifying, rating, and integrating a large number of different and/or redundant data sources. The end user may flexibly alternate his or her view of the event by selecting different positions within a VR environment. Such positions may be selected from the locations of multiple data providers.

Generating a VR Experience of an Event

Systems and methods disclosed herein provide a virtual reality (VR) experience to a data consumer (or user using a head mounted display (HMD) or virtual reality (VR) glasses). Third-party information and virtual sensors that may process the third-party information are identified. VR environment output data may be updated continually to change a data consumer's location within the VR environment to provide the data provider with a high-quality user experience.

Figure 2:
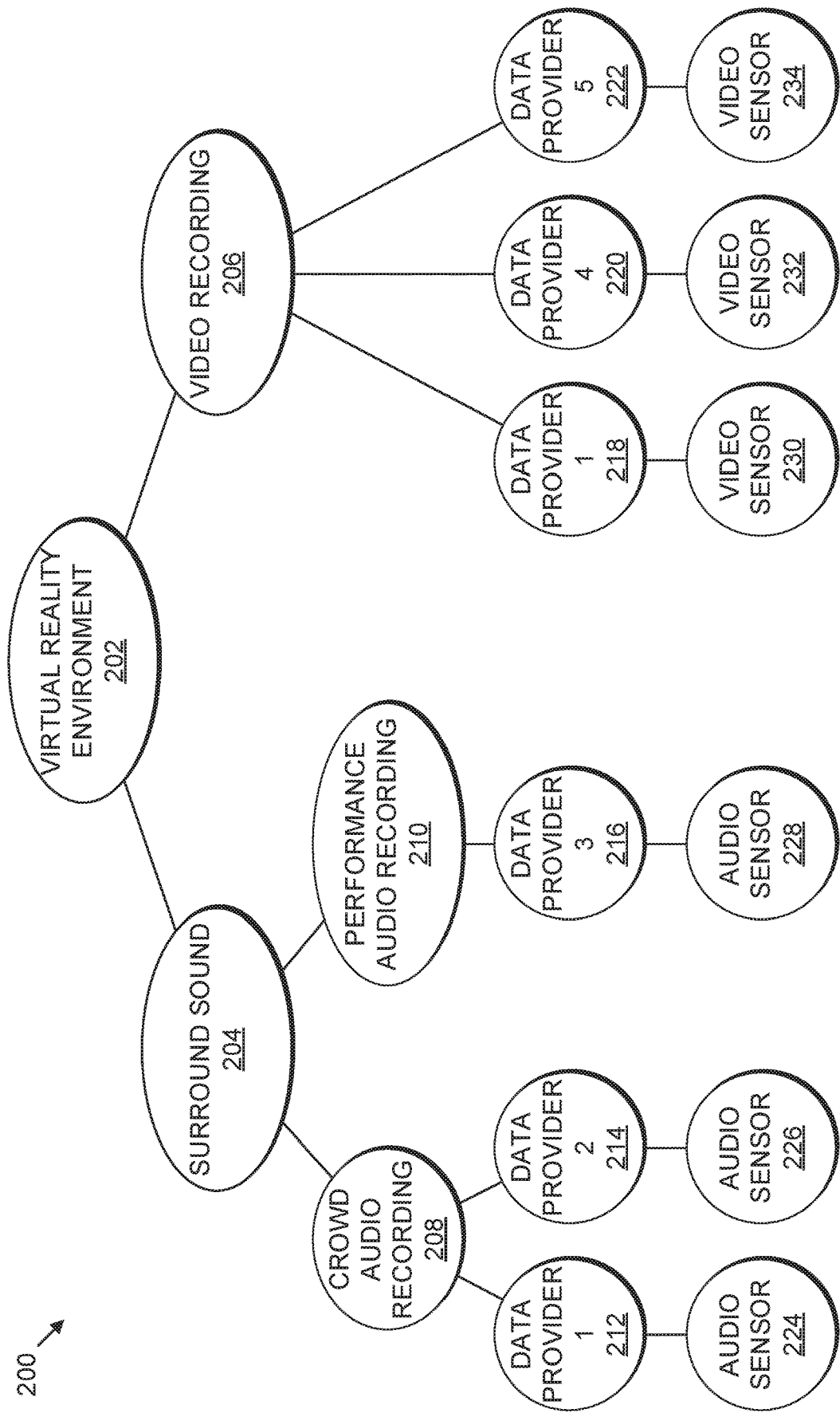
FIG. 2 is a data structure diagram illustrating a virtual reality environment data sensor structure according to some embodiments.

For one embodiment, an information marketplace may maintain a database of information for data sources that includes characteristics of data source measurements and relationships between registered data sources. FIG. 2 shows one example of a set of relationships between data providers, devices, and sensors.

Identifying Available Data Sources

FIG. 2 is a data structure diagram illustrating a virtual reality environment data sensor structure according to some embodiments. FIG. 2 shows a hierarchy 200 for classifying virtual sensors used in a VR environment 202 (or product). For one embodiment, virtual sensors may be classified as virtual audio sensors 224, 226, 228 and virtual video sensors 230, 232, 234. For FIG. 2, virtual audio sensors are shown on the left side of the figure under the surround sound oval 204. Virtual video sensors are shown on the right side of the figure under the video recording oval 206. Surround sound virtual sensors are divided into crowd and performance audio recording virtual sensors. For the example shown in FIG. 2, a crowd audio recording virtual sensor is generated with data from data providers 1 and 2 (212, 214), while a speech audio recording virtual sensor is generated with data from data provider 3 (216). Data providers 1 and 2 (212, 214) each have an audio sensor that records a crowd audio recording 208 (or reading). Data provider 3 (216) has an audio sensor that records speech audio readings (or a performance audio recording 210). For the example shown in FIG. 2, video recording virtual sensor data is generated with data from data providers 1, 4, and 5 (218, 220, 222). Data providers 1, 4, and 5 (218, 220, 222) each have a video sensor (230, 232, 234) that records video sensor data. For this example, data provider 1 generates both video data and crowd audio data.

A data consumer (or user) unable to attend an event in person may experience the event via a virtual reality environment. For example, a data consumer may want to attend a speech by the Pope in Philadelphia but is unable to attend because the data consumer did not win a ticket given away in a raffle.

A data consumer may send a request to an information marketplace. The data consumer requests to visit a virtual environment of an event. The data consumer is able to move around the crowd and experience an event from different locations. The data consumer receives continual updates on the crowd's level of excitement and features of interest, such as statistics regarding attendees or fact checking of statements recorded. A level of excitement may be a sensor-derived metric or range value. Such metrics, statistics, or information may be displayed as overlays within a VR environment. For one embodiment, an overlay for a rendered virtual view within a virtual environment may be generated based on information regarding a geometric region associated with a sensor-driven metric. For example, a level of crowd excitement metric may be derived from a sensors audio measurements. Sound level ranges may be correlated to an excitement level metric.

A request may be processed and analyzed using techniques described in U.S. Provisional Patent Application No. 62/297,589. Data sources, boundary conditions, and quality and reliability thresholds for data collection may be identified and indicated.

A VR creator may retrieve a list of available data sources, associated data source types (or groups) (such as video or audio), and physical locations of the available data sources from an event-scheduling database. The event-scheduler may assign data sources before an event begins using techniques described in U.S. Provisional Patent Application No. 62/305,304. The VR creator may reuse data sources within an ad-hoc sensor network. Data sources used for collecting data for other data campaigns may be re-used. A live scheduler may identify data sources types (or groups) for a data collection campaign (or an event), such as video sources, audio sources, heart rate sensors, data provider profiles, and fact checking databases. Video sources (which may include dedicated cameras, cell phone cameras, smart glasses, and security cameras) may record video of the event from different angles. Audio sources (which may include dedicated microphones, cell phone microphones, and smart glasses) may record speech and cheering or booing from the crowd. Heart rate sensors (which may be part of a fitness tracker) may be used to measure the excitement of the crowd. Data provider profiles (which may be stored in a marketplace sensor structure database) may add additional features of interest, such as gender distribution of excitement measurements. A fact checking database (such as an external database for checking veracity of speech statements) may be used to check statements that coincide with excitement levels that are above a high excitement level threshold or below a low excitement level threshold.

The VR creator may identify virtual sensors that are capable of aggregating data from sensors within a sensor group (e.g., video sensors) as well as data from different sensor groups (e.g., matching video with audio recordings).

The VR creator also identifies virtual sensors capable of processing data to deliver additional requested information (e.g., excitement level).

One embodiment of a VR creator identifies the data providers sensors in a data sensor structure database. The VR creator may search through virtual sensors related to the identified sensors, such as the virtual sensors shown in FIG. 2. The VR creator may identify a path from a real sensor to a virtual sensor. A virtual sensor may communicate output data to be used by the VR event.

For one embodiment, the VR creator may use configuration meta data as described in Application No. 62/320,943 for the identified virtual sensors to identify virtual sensor input constraints (e.g., synchronization of audio and video data to avoid seeing an event from a different viewpoint than hearing the event) and to receive high-quality virtual sensor outputs (such as VR data of the event). The VR creator may analyze the list of available data sources and related virtual sensor input constraints to determine whether or not to add more sensors to the ad-hoc sensor network.

Generating a VR-Event Map

The VR creator may generate an interactive VR-event map to communicate, to the data consumer, physical locations of data source types to enable the data consumer to adjust his or her location within the VR event environment. The VR-event map (and the data consumer's access) is limited to the area in which the event takes place. Certain sectors (e.g., staff-only areas or bathrooms) may be excluded from the VR environment. The VR-event map may include: floor plans of the area in which the event takes place as described in 62/305,304 and physical locations of data source types (stationary and movable sensors and data provider positions within the crowd) as described in Application No. 62/320,943. One embodiment of a VR-event map also displays a heat map of crowd excitement levels, which may be updated in real-time.

Figure 3:
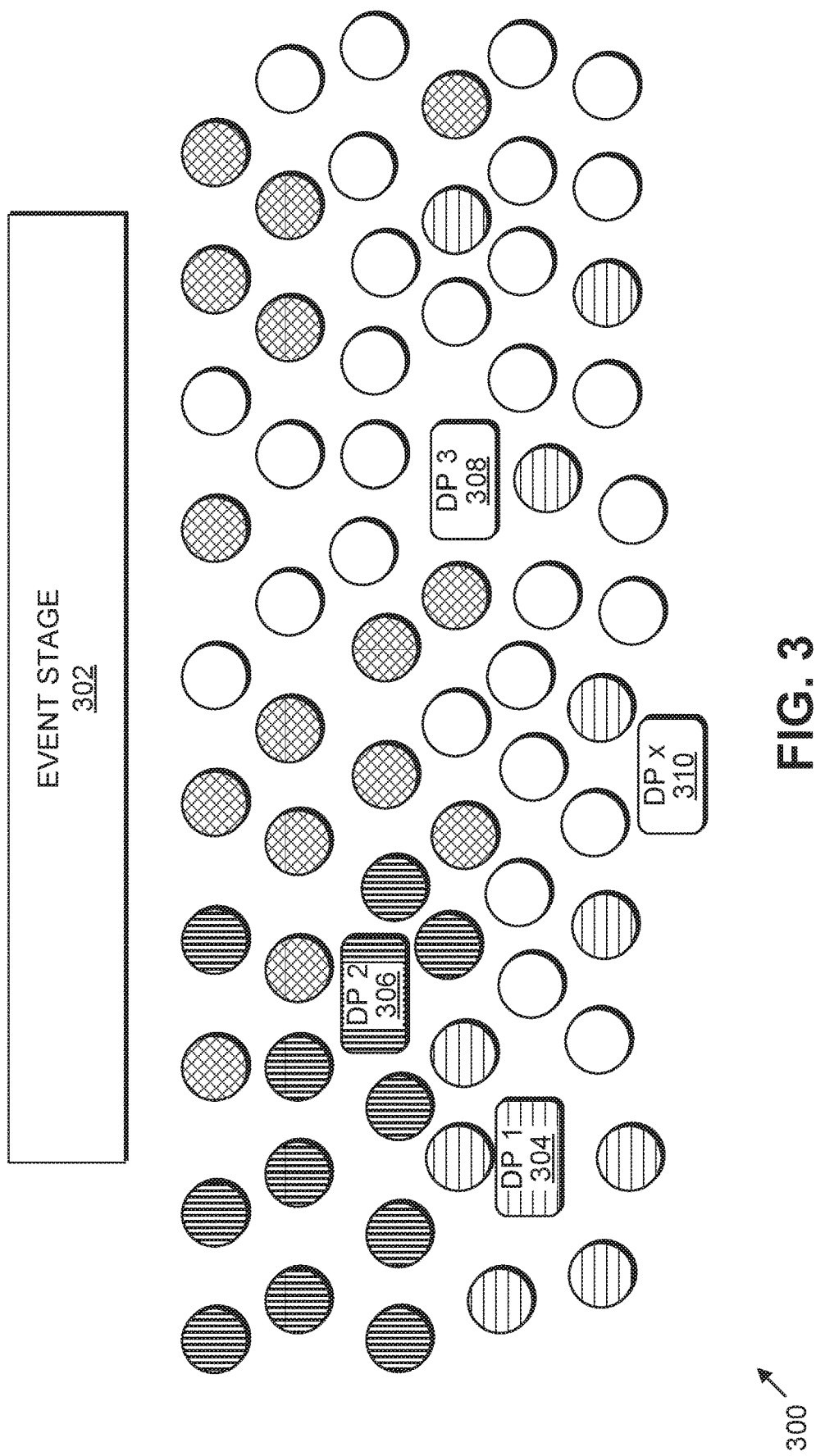
FIG. 3 is a schematic plan view illustrating an example set of crowd excitement levels according to some embodiments.

FIG. 3 is a schematic plan view illustrating an example set of crowd excitement levels according to some embodiments. FIG. 3 is an exemplary embodiment of an excitement heat map 300. An excitement heat map 300 shows crowd excitement level measured by data providers at an event. For the example shown in FIG. 3, three data providers (1, 2, and 3) 304, 306, 308 are shown distributed in front of an event stage 302, along with a measured crowd excitement level that is indicated with a fill pattern. A data provider labeled "DP x" 310 is shown to indicate that more than three data providers may measure crowd excitement level at an event. Crowd excitement level measurements may be used to estimate crowd excitement levels for individual people in the crowd. People in the crowd are shown as circles in FIG. 3.

For the exemplary embodiment of FIG. 3, a high level of excitement is indicated with a vertical line fill pattern. A medium-high level of excitement is indicated with a lattice fill pattern. A medium level of excitement is indicated with a horizontal line fill pattern. A low level of excitement is indicated with no fill pattern. For FIG. 3, data provider 1 (DP 1) measured a medium level of crowd excitement. Data provider 2 (DP 2) measured a high level of crowd excitement. Data provider 3 (DP 3) measured a low level of crowd excitement. For FIG. 3, the excitement heat map shows the location of data providers and individuals in the crowd relative to the event stage. Icons for the data providers and the individuals are shaded or colored with a fill pattern or color that corresponds to a level of crowd excitement. For one embodiment, the excitement heat map may be updated in real-time.

Generating a VR Environment and a User's Starting Position

For one embodiment, the VR creator identifies a starting position within a crowd for the VR environment of the event. For the example shown in FIG. 3, the VR creator may determine that data provider 1 provides the best quality audio and video and may start the VR event with the user equal to the location of data provider 1. For one embodiment, the VR creator may continually evaluate the quality of incoming data and VR-event data that is displayed (or rendered) to the data consumer. For one embodiment, a data consumer device may receive quality assessments corresponding to cameras recording data for the event. A metric may be calculated that combines quality assessments and crowd excitement level. Such a metric may be used to enable a user to select a location within a VR environment of an event that is associated with high quality video (or audio) and a high level of crowd excitement. For one embodiment, a speaker at an event may be highlighted with regard to the background, which enables a data consumer to focus attention on the speaker.

For one embodiment, the VR creator may display excitement information, which may be used to create a crowd excitement heat map in the VR environment itself. As a result, the data consumer may see this crowd excitement information without leaving the VR environment. Both the highlighting and the direct excitement heat map within the VR event are options that the data consumer may turn on or off.

Figure 4:
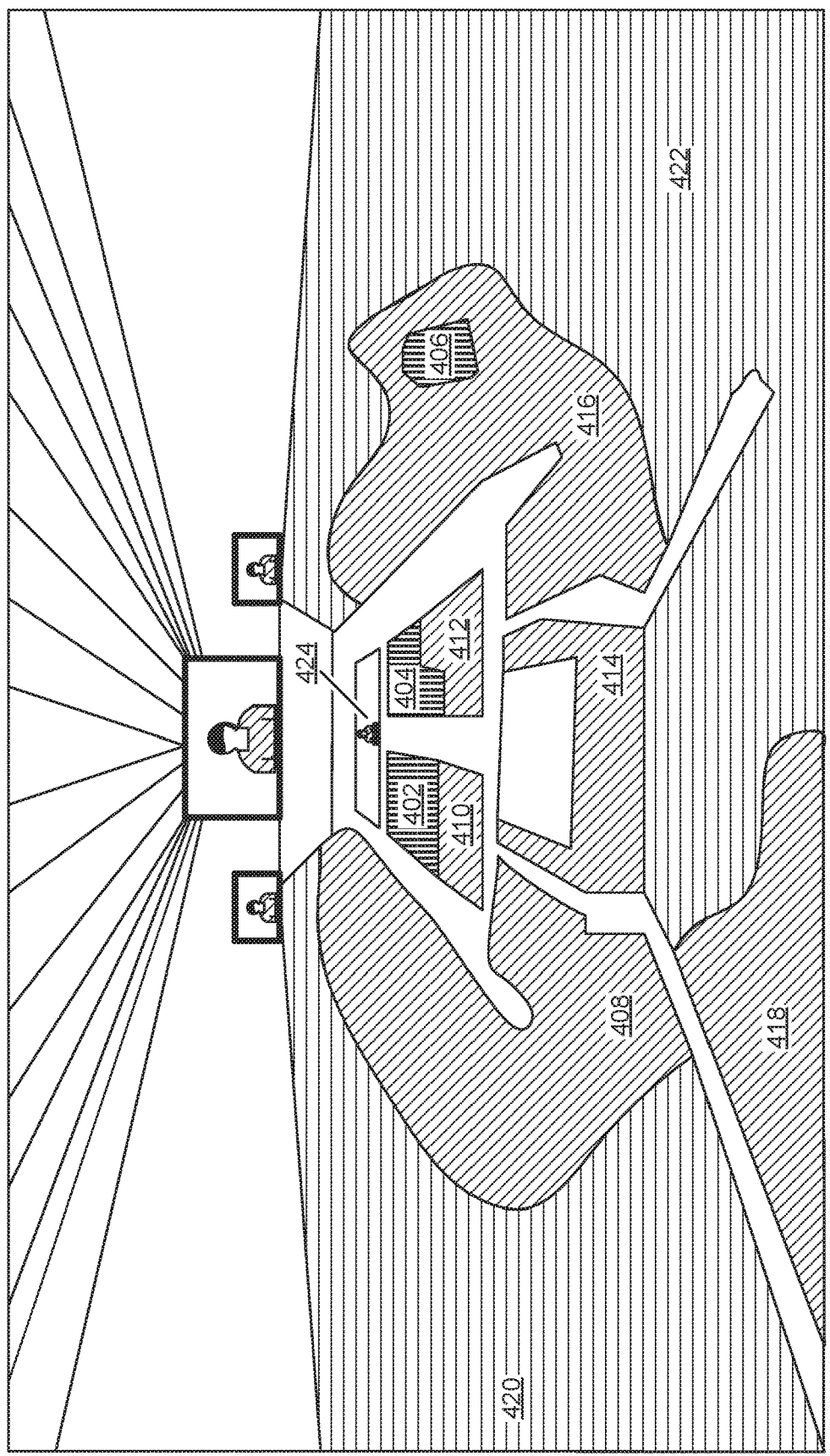
FIG. 4 is a schematic perspective view illustrating an example overlay displaying crowd excitement levels that may be displayed by a user's VR display according to some embodiments.

FIG. 4 is a schematic perspective view illustrating an example overlay displaying crowd excitement levels that may be displayed by a users VR display according to some embodiments. FIG. 4 shows a perspective view of a VR event 400. For this example, the speaker 424 is shown in the center of the figure with three projection screens shown behind the speaker. FIG. 4 shows an exemplary embodiment for highlighting the speaker 424 to focus the user's attention on the speaker. The VR heat map of crowd excitement is displayed as an overlay over the rendered virtual view of the crowd. For the example shown in FIG. 4, low levels of crowd excitement may be shown with a horizontal line fill pattern 420, 422. Medium levels of crowd excitement may be shown with a diagonal line fill pattern 408, 410, 412, 414, 416, 418. High levels of crowd excitement may be shown with a vertical line fill pattern 402, 404, 406. For the example of FIG. 4, high levels of crowd excitement are shown for attendees sitting in the first few rows 402, 404 nearest the speaker 424 and in a section 406 on the right side of the stadium. Low levels of crowd excitement are shown for attendees sitting the furthest away 420, 422 from the speaker, while medium levels of crowd excitement are shown for the in-between areas 408, 410, 412, 414, 416, 418.

For some embodiments, a VR creator may continuously evaluate incoming data and a VR event that is shown to a data consumer. Based on image processing, the VR creator may highlight an event's subject in comparison with the background to allow the data consumer to discern the attention focus within the VR environment. Also, a VR creator may use excitement information to create a heat map (or excitement map) that may be displayed to a data consumer within a VR environment. The data consumer may be able to see the excitement information without leaving the VR environment. For some embodiments, a data consumer may set preferences to turn on or off displaying within the VR environment of highlighting of an event's subject and to turn on or off displaying within the VR environment of a heat map (or excitement map). For some embodiments, a video stream may be displayed as a virtual reality display. For some embodiments, a method may include displaying, in a virtual reality environment, a video stream of an event captured by a camera at the event; and displaying, as an overlay on the video stream, media metric data of the event captured by one or more sensors. Media metric data may include data such as crowd excitement, for example, in regions of the video stream. An overlay may color different regions different colors, for example, such as red for high crowd excitement, yellow for medium crowd excitement, and green for low crowd excitement. Some embodiments may use shading patterns, for example, such as horizontal lines for high crowd excitement, diagonal lines for medium crowd excitement, and vertical lines for low crowd excitement. Some embodiments may use luminosity or intensity of a color, for example, such as dark gray for high crowd excitement, medium gray for medium crowd excitement, and light gray for low crowd excitement.

Adjusting Position within a VR Environment

Figure 5:
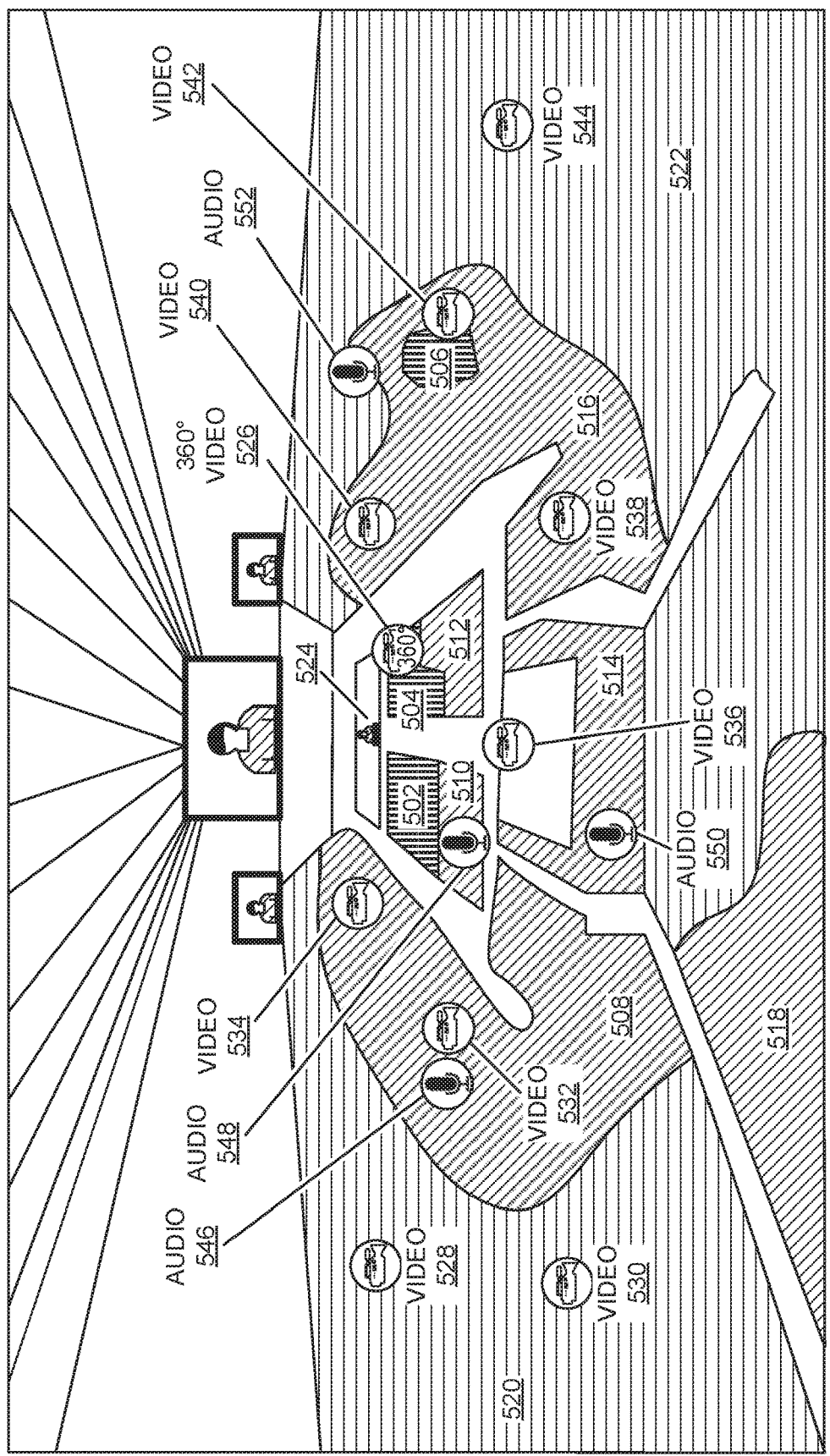
FIG. 5 is a schematic perspective view illustrating an example overlay displaying crowd excitement levels and locations of available data sources that may be displayed by a user's VR display according to some embodiments.

FIG. 5 is a schematic perspective view illustrating an example display of a live event with an overlay displaying crowd excitement levels and locations of available data sources that may be displayed by a users VR display according to some embodiments. FIG. 5 shows a perspective view of a VR event 500 with the virtual location of data providers 526, 528, 530, 532, 534, 536, 538, 540, 542, 544, 546, 548, 550, 552 shown in the diagram. The map in FIG. 5 of crowd excitement overlaid with virtual sensor locations enables a user (or data consumer) to select a new virtual location with a higher level of crowd excitement. FIG. 5 shows the same event shown in FIG. 4, and virtual sensor locations also are indicated. FIG. 5 uses the same correlation of crowd excitement levels to fill patterns as FIG. 4. For example, low levels of crowd excitement may be shown with a horizontal line fill pattern 520, 522. Medium levels of crowd excitement may be shown with a diagonal line fill pattern 508, 510, 512, 514, 516, 518. High levels of crowd excitement may be shown with a vertical line fill pattern 502, 504, 506. The example VR event 500 of FIG. 5 includes a 360° video sensor 526, nine video sensors 528, 530, 532, 534, 536, 538, 540, 542, 544 and four audio sensors 546, 548, 550, 552. For one embodiment, a condensed video captured by a video sensor may be displayed next to or in place of each video sensors icon on the map. A condensed video be a short length (such as 5 seconds) video captured by a video sensor. Similarly, a condensed audio recording may be available for the user to hear prior to selecting an audio sensor.

For one embodiment, the data consumer uses his or her VR glasses (or HMD) and surround sound system to follow the event in a VR environment. The data consumer may decide to move closer to the stage because the VR creator indicates that the crowd excitement measured closer to the stage is higher than the crowd excitement in the proximity to the data consumers current position. The data consumer views the position of other data providers within the VR environment and chooses the position of a data provider, who is standing closer to the stage. In a case where the new data provider does not record sound, the VR creator uses the sound recording of another data provider who is located close to the video provider.

For example, one of the data providers recording video is using a 360° camera. For the example of FIG. 5, the data provider 526 located just right of the speaker is recording 360° video. The data consumer moves his or her head to look around, and a head tracking system detects the changes in orientation. The data consumer is presented with video recorded from a different angle.

For one embodiment, the VR creator continually analyzes the incoming data to find the best-fitting data sources for a position within the crowd and to update the excitement heat map. The VR creator may analyze the virtual position of the data consumer at the VR event and the physical positions of data sources collecting data at the event to determine which data sources are closest to the virtual position of the data consumer and provide the best match with data sources. Those data sources may be selected to provide VR event data. At the end of the event, the data consumer may log out of the VR environment.

For some embodiments, a method may include: displaying a first video stream of an event captured by a first camera at a first position; displaying an icon as an overlay on the first video stream, with a position of the icon on the display indicating a second position of a second camera capturing a second video stream; and displaying an excitement map as an overlay on the first video stream, wherein the excitement map indicates different levels of crowd excitement in different regions of the first video stream. FIG. 5 shows example icons, such as 360° video sensors (cameras) 526, video sensors 528, 530, 532, 534, 536, 538, 540, 542, 544, and audio sensors (microphones) 546, 548, 550, 552. For some embodiments, levels of crowd excitement data may be received from user devices (such as microphones and video cameras that may be part of a users smart phone) at an event, and an excitement map may be generated from the levels of crowd excitement data received.

For some embodiments, audio data may be collected from a plurality of audio sensors distributed throughout a crowd at an event, and levels of crowd excitement may be determined based at least in part on levels of crowd noise captured at the plurality of audio sensors. For example, the range of sound loudness of crowd noise recorded by the plurality of audio sensors (such as microphones) may be segmented into three sound loudness groups, for example, and crowd excitement may be associated at least in part on the sound loudness recorded by each of the plurality of audio sensors.

For some embodiments, heart rate data may be collected from a plurality of heart rate sensors worn by a plurality of participants in a crowd at an event, and levels of crowd excitement may be determined based at least in part on heart rate levels captured by the plurality of heart rate sensors. For example, the range of heart rate data recorded by the plurality of heart rate sensors may be segmented into three groups, for example, and crowd excitement may be associated at least in part on the heart rate data recorded by each of the plurality of heart rate sensors. For example, a plurality of heart rate sensors may record a range of 50 to 95 beats per minute of the participants wearing heart rate sensors. The heart rate data may be segmented into 3 groups: 50 to 65 beats per minute may be associated with a low level of crowd excitement, 66 to 80 beats per minute may be associated with a medium level of crowd excitement, and 81 to 95 beats per minute may be associated with a high level of crowd excitement.

For some embodiments, movement data may be collected from a plurality of accelerometers worn by a plurality of participants in a crowd at an event, and levels of crowd excitement may be determined based at least in part on movement levels captured by the plurality of accelerometers. For example, the range of movement data recorded by the plurality of accelerometers may be segmented into three groups, for example, and crowd excitement may be associated at least in part on the movement data recorded by each of the plurality of accelerometers.

For some embodiments, image data may be collected from a plurality of image sensors (such as cameras, for example) worn by a plurality of participants in a crowd at an event, and levels of crowd excitement may be determined based at least in part on image detection analysis of image data captured by the plurality of accelerometers. For example, image detection analysis may be used to determine the amount of movement of a participant, such as determining the amount of movement of a participant wearing an image sensor in relation to a stationary object (like a wall) that may appear in an image captured by the image sensor. The range of movement of participants may be segmented into groups, say 4 or any other number, for example, and crowd excitement may be associated at least in part on the movement levels determined from the image data recorded by each of the plurality of image sensors.

International Application No. PCT/US2017/017694, entitled "Systems and Methods for Scheduling Collection of Sensor Data," filed Feb. 13, 2017, which claims benefit under 35 U.S.C. § 119(e) from U.S. Provisional Patent Application Ser. No. 62/297,589, entitled "Systems and Methods for Scheduling Collection of Sensor Data," filed Feb. 19, 2016, U.S. Provisional Patent Application Ser. No. 62/305,304, entitled "Systems and Methods for Scheduling Collection of Sensor Data," filed Mar. 8, 2016, and U.S. Provisional Patent Application Ser. No. 62/320,943, entitled "Systems and Methods for Scheduling Collection of Sensor Data," filed Apr. 11, 2016, are each hereby incorporated by reference in their respective entireties.

Some embodiments of a method may include: displaying three-dimensional (3D) model data in a virtual reality (VR) environment; and displaying, as an overlay on the 3D model data, media metric data captured by one or more sensors in the real world environment. Media metric data may indicate a level of crowd excitement in one or more regions of the real world environment. For example, three-dimensional LiDAR data (or another set of 3D model data) may be measured for a real-world environment and displayed in a VR environment. An overlay, such as colors, shading patterns, or luminosities or intensities of colors, may be displayed over the 3D model data to indicate levels of crowd excitement in different regions of a real world environment. The media metric data may be measured by a plurality of sensors and received by a virtual reality environment host device, such as, for example, a smart phone, a laptop, or a head-mounted display. The media metric data may be communicated to a virtual reality environment host device via a communications network and one or more servers, for example.

A method may further include, for some embodiments, collecting the media metric data from one or more sensors distributed in one or more regions of a real world environment, wherein the media metric data comprises audio data captured by at least one of the one or more sensors, and wherein the levels of crowd excitement are determined based at least in part on levels of crowd noise determined from the audio data. For example, a plurality of microphone sensors may record crowd noise over a range of 70 to 100 dB. A low level of crowd excitement may be associated with crowd noise in the range of 70 to 80 dB. A medium level of crowd excitement may be associated with crowd noise in the range of 80 to 90 dB. A high level of crowd noise may be associated with crowd noise in the range of 90 to 100 dB.

Media metric data, which may be heart rate data, may be collected, for some embodiments, from a plurality of sensors distributed in one or more regions of a real world environment. Levels of crowd excitement may be determined based at least in part on heart rate levels captured by the plurality of sensors. The overall range of values of the media metric data may be determined, and the data may be divided into groups. Each group may be associated with a level of crowd excitement. Some embodiments may combine two or more data types and associate the combined data with levels of crowd excitement.

For some embodiments, one or more icons may be displayed overlaid on 3D model data of a real world environment. The icons may be displayed in positions within a VR environment that indicate respective locations of one or more sensors in the real world environment.

Displaying media metric data, for some embodiments, may include: displaying, for each of the one or more sensors, an indication of a location in the virtual reality environment associated with a location at the event of the respective sensor; and displaying, for each of the one or more sensors, an indication of level of crowd excitement at the location at the event of the respective sensor. An indication of a location of a sensor may include displaying, for example, an icon, text with a name of the sensor, or a symbol, at a location within a VR environment associated with a real world location of the sensor. Similarly, an indication of level of crowd excitement may include displaying, for example, a number equal to the level of crowd excitement, or an icon or symbol associated with the level of crowd excitement, at a location within a VR environment associated with a real world location of the sensor.

Some embodiments of a method may further include collecting the media metric data from one or more sensors distributed in one or more locations at an event, wherein the media metric data may include audio data captured by at least one of the one or more sensors. The levels of crowd excitement may be determined based at least in part on levels of crowd noise determined from the audio data. Some embodiments of a method may further include collecting the media metric data from one or more sensors distributed in one or more locations at an event, wherein the media metric data may include heart rate levels captured by at least one of the one or more sensors. The levels of crowd excitement may be determined based at least in part on the captured heart rate levels. Some embodiments of a method may further include collecting the media metric data from one or more sensors distributed in one or more locations at an event, wherein the media metric data comprises movement data captured by at least one of the one or more sensors. The levels of crowd excitement may be determined based at least in part on the captured movement data. Collecting media metric data for some embodiments may include measuring media metric data. Collecting media metric data with some embodiments may include receiving media metric data measured by another source.

Messaging

Figure 6A:
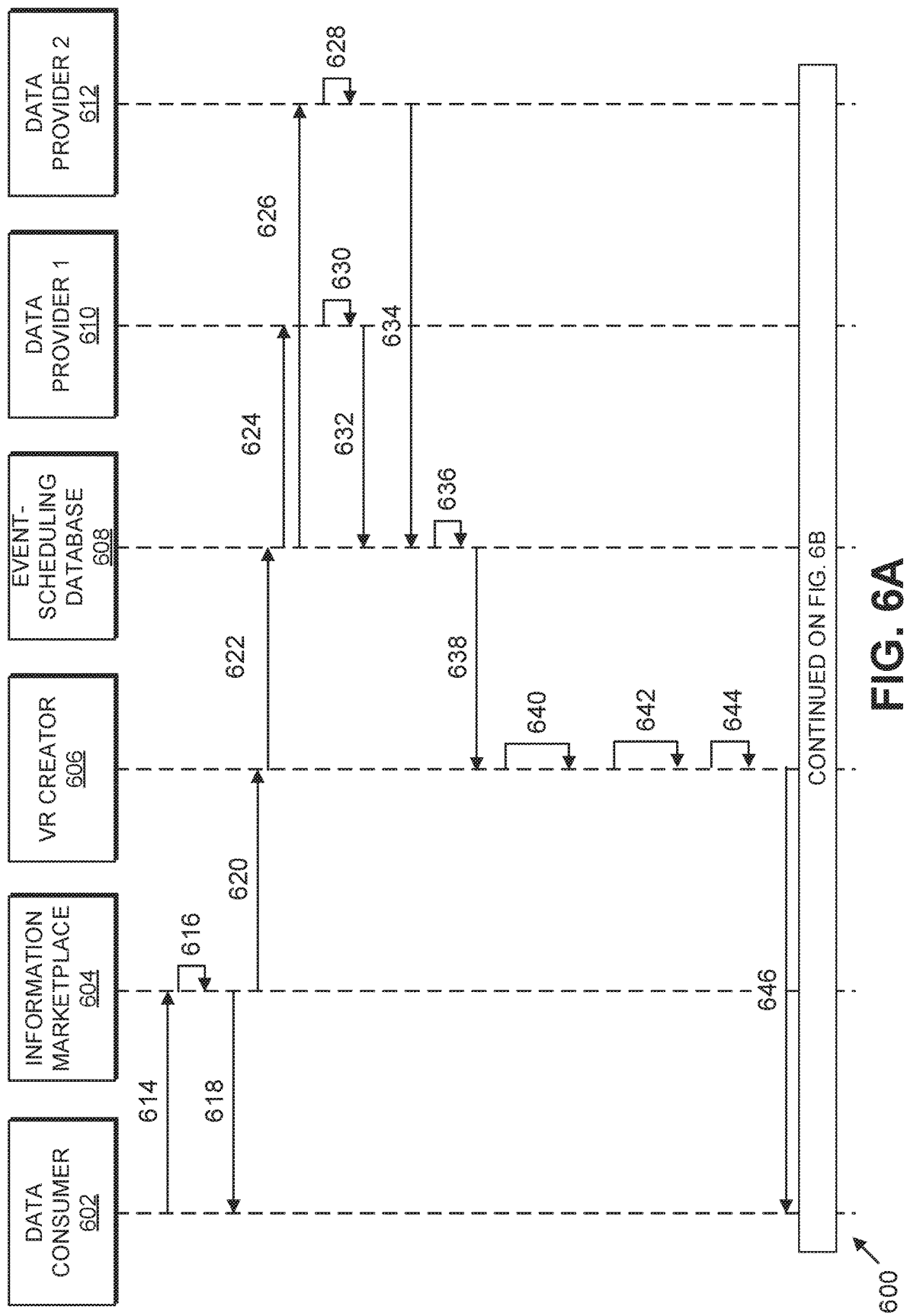
FIGS. 6A and 6B are message sequencing diagrams illustrating an example process for generating multimedia data modified for a virtual location within an VR environment according to some embodiments.
Figure 6B:
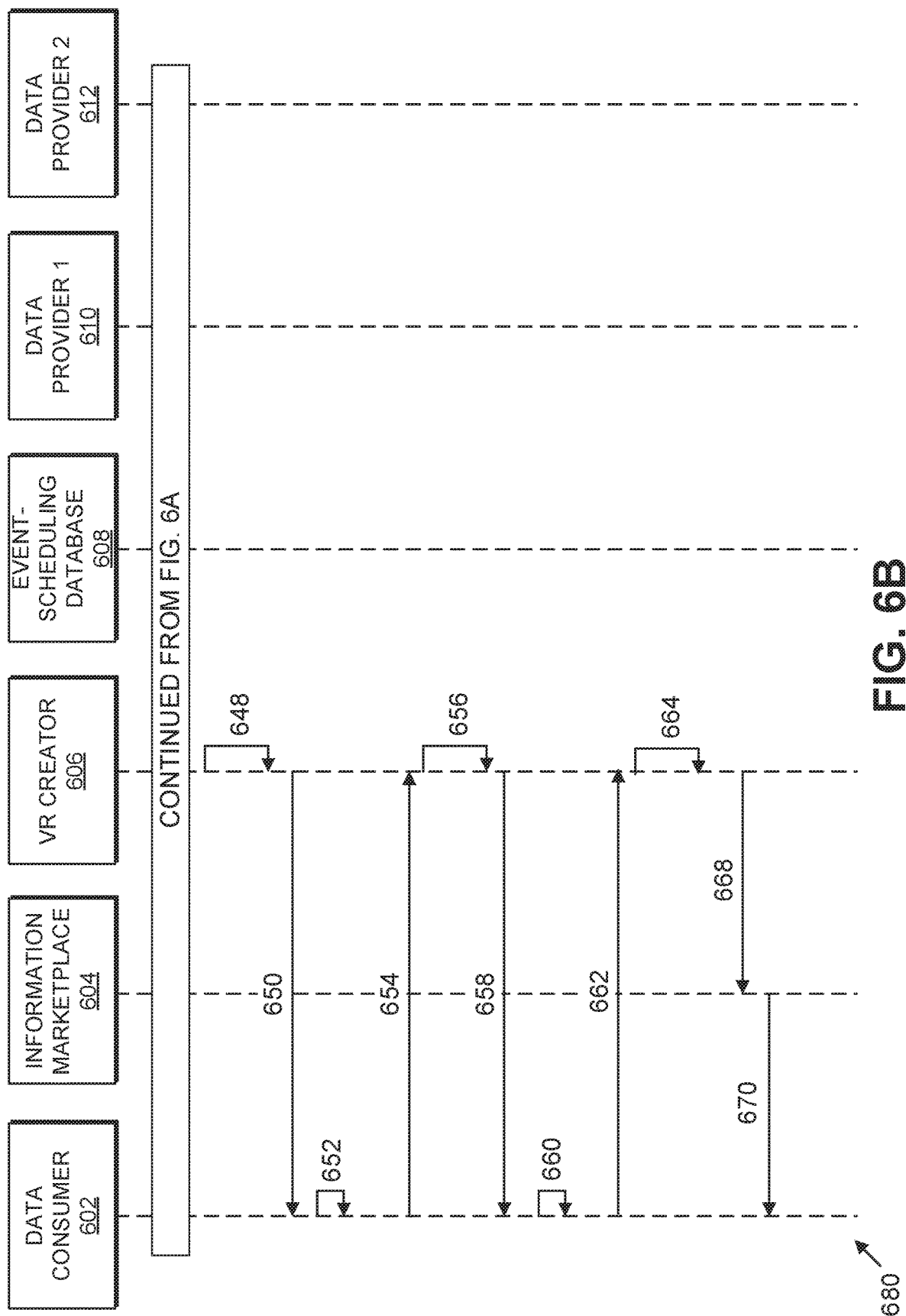

FIGS. 6A and 6B are message sequencing diagrams 600, 680 illustrating an example process for generating multimedia data modified for a virtual location within an VR environment according to some embodiments. FIGS. 6A-6B show one embodiment of a series of messages used with generating a virtual reality (VR) map and modifying multimedia data for a virtual location within a VR environment. A data consumer 602 (or a head mounted display (HMD) or VR glasses being used by a user) requests 614 virtual reality data (such as audio and video multimedia data) from a virtual information marketplace 604. A virtual information marketplace 604 may process 616 the query and send 618 a query response to the data consumer 602. An information marketplace 604, which may be a server or process, may send 620 an indication of the query response to a virtual reality creator 606 server or process. A VR creator 606 may send 622 to an event-scheduling database 608 a request for a list of data sources. The event-scheduling database 608 may send 624, 626 data collection requests to data providers 1 and 2 (610, 612). For this example, only two data providers are listed, but an event-scheduling database 608 may send data collection requests to many more providers. Data providers 1 and 2 (610, 612) each may start 628, 630 to collect data and may send 632, 634 that data to the event-scheduling database 608. The event-scheduling database 608 may process the data, generate 636 a list, and send 638 the list of data sources to the VR creator 606. The VR creator 606 may identify 640 data sources and virtual sensors and identify 642 constraints of those virtual sensors. The VR creator 606 may use this identified data to generate 644 a VR-event map with locations of available data sensors. The VR creator 606 may send 646 this VR-event map to the data consumer 602 (or HMD or VR glasses).

The VR creator 606 may identify 648 a starting position for a user within a virtual reality environment. For one embodiment, the starting position may be based on a quality assessment of multimedia data generated by the data providers. The starting position may be a location with an optimal proximity to data providers generating multimedia data with a quality above a high-quality threshold. The VR creator 606 may send 650 VR data to the data consumer 602. For one embodiment, the VR data may include rendering information for a virtual view associated with a camera position for the event. For one embodiment, the VR data may include rendering information for a virtual view that is a combination of two or more sets of rendering information that are each associated with a camera position for the event. For one embodiment, VR data may include audio and video multimedia data generated by data providers 1 and 2 (or more data providers for one embodiment). A data consumer 602 (via an HMD or VR glasses) may follow 652 an event within a virtual reality environment. A data consumer 602 may send 654 to the VR creator 606 a selection of a new position within a VR environment. The VR creator 606 may process 656 the new position request and modify the VR data for the new location within the VR environment. The VR creator 606 may send 658 the modified VR data to the data consumer 602 (or HMD or VR glasses). The data consumer 602 may turn 660 his or her head and move around with the VR environment via an HMD or VR glasses (or an HMD or VR glasses may detect a movement). If the data consumer 602 is done, a logout request may be sent 662 to the VR creator 606. The VR creator 606 may log out 664 the user and may send 668 a notification of the logout to the information marketplace 604. The information marketplace 604 may send 670 a notification of the logout to the data consumer 602.

For some embodiments, a method may include displaying a second video stream (in addition to displaying a first video stream) in response to receiving data indicating a user selection of an icon displayed as an overlay on the first video stream, wherein the icon indicates the location of a camera capturing the second video stream.

Alternate Embodiments

For one embodiment, a data consumer may select an event from a list of names or summaries of all running events. For one embodiment, a data consumer may send a selection of sensors for inclusion and/or exclusion from data collection for an event. For one embodiment, a data consumer may actually attend an event and wear AR glasses or an HMD device to see and/or hear additional information (such as overlaid information or augmented/enhanced audio). For one embodiment, a request for a virtual reality environment of an event may be a request entered in natural language, such as "Virtual access to the Pope's speech in Philadelphia with crowd excitement level and additional features of interest."

For one embodiment, a VR creator may determine if a data consumer device has access to all hardware components and software applications or processes used to view a VR environment. A VR creator may determine recommended settings to optimally view a VR environment. For one embodiment, a VR creator may limit the list of data sources to correspond to the identified hardware and software accessible by the data consumer device. For one embodiment, a VR creator also may list additional hardware/software a data consumer device may use to view a VR environment. The list of additional hardware/software may include links to hardware/software available from an information marketplace. For one embodiment, a negotiator as described in Application No. 62/305,304 may be used to calculate an extended price. A data consumer device may receive, from a negotiator, a notification of an extended price. An extended price may be an upper bound of the price paid by the end user, and the extended price may depend on multiple factors, such as the pricing model chosen by the data consumer (e.g., monthly subscription, pay-per-view) and the costs for providing the VR of the event.

Figure 7A:
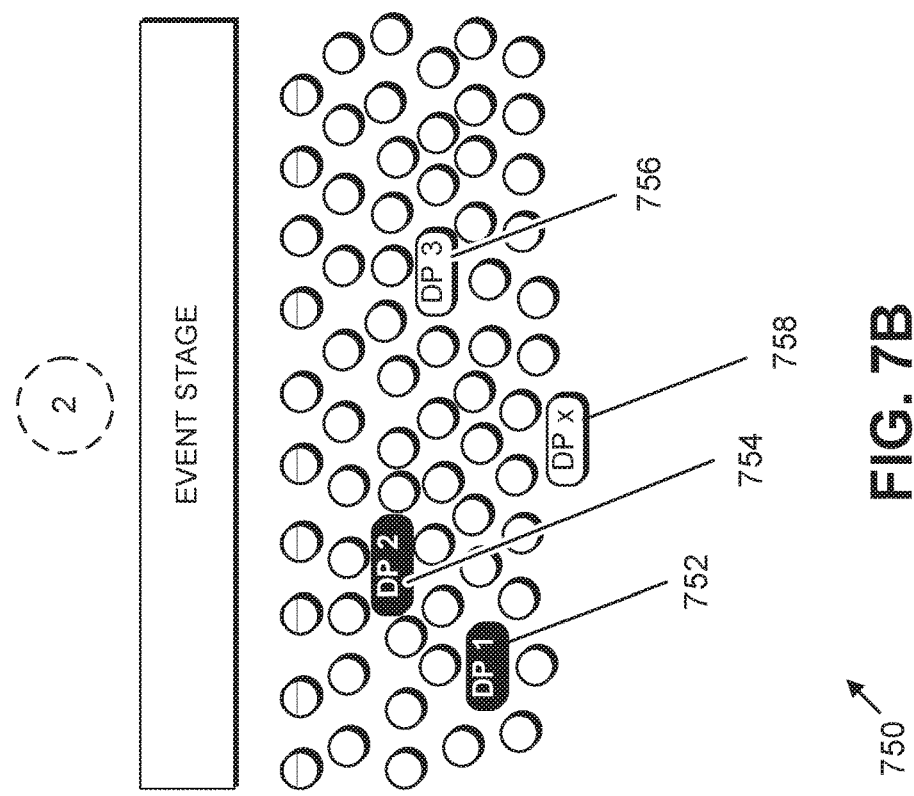
FIGS. 7A and 7B are schematic plan views illustrating an example event showing data providers used for modifying multimedia data for a virtual location according to some embodiments.
Figure 7B:
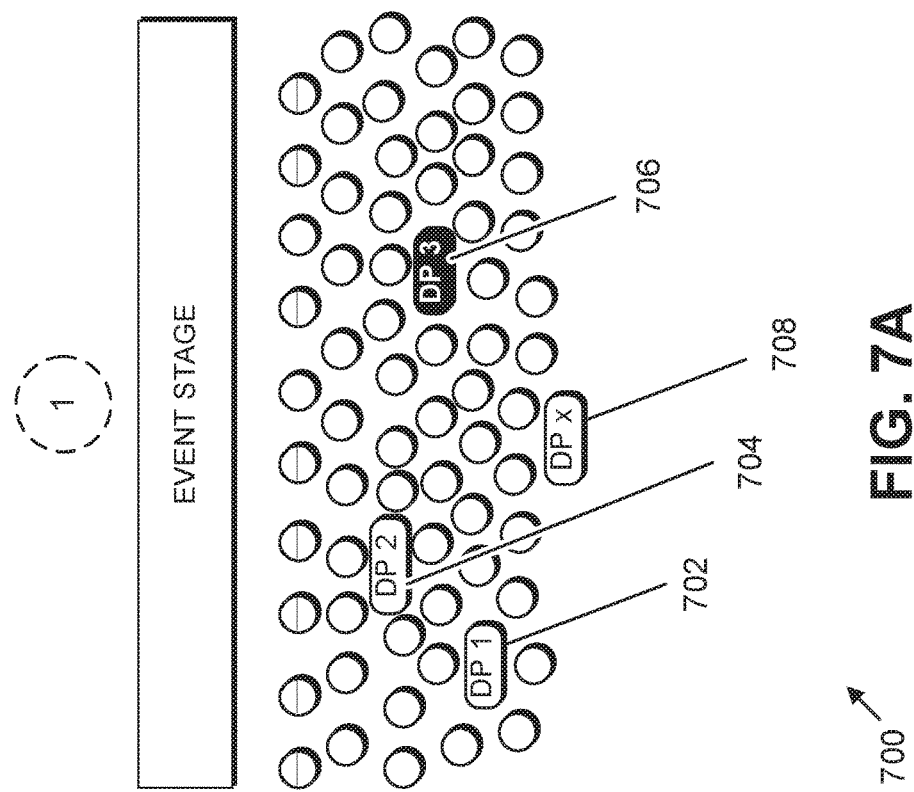

FIGS. 7A and 7B are schematic plan views illustrating an example event showing data providers used for modifying multimedia data for a virtual location according to some embodiments. FIGS. 7A and 7B show one embodiment of a VR-event map. A user may change positions within a VR environment 700, 750 for an event. The user may be at a virtual location associated with data provider 3 (706) within a VR environment 700 at a time t1. FIG. 7A shows data provider 3 (DP 3) 706 highlighted in black with white characters. DP 1 (702), DP 2 (704), and DP x (708) are un-highlighted with black characters on a white background. At a time t2, a user may select a new virtual location that is associated with data providers 1 and 2 (DP 1 and DP 2, respectively) 752, 754. FIG. 7B indicates the new virtual location by highlighting DP 1 and DP 2 (752, 754) with black icons and white characters. DP 3 and DP x (756, 758) are un-highlighted with black characters on a white background. DP x 708, 758 in FIGS. 7A and 7B indicate that there may be more than three data providers for some embodiments.

For one embodiment, a data consumer device sends a log out request to a VR creator, and a negotiator device or process as described in Application No. 62/305,304 calculates a price for the event. The data consumer device may receive notification from a negotiator that indicates the calculated price (which may include notification of a debit of data consumer's marketplace account). The calculated price may be based on the length of time of the visit to the event's VR environment, the number data sources the data consumer used, and whether there is an event organizer fee (which may be paid by an information marketplace to an event organizer). The information marketplace may have an agreement with an event organizer and may sell tickets for VR access to an event. An event organizer may have additional data sources (such as security cameras) that are available via the information marketplace for additional purchase for an event. A supportive data analysis may be performed on provided data to determine if the provided data matches the requested data. Such an analysis may look at other data provided by a data provider for a similar event. Such an analysis may also include looking at feedback given by other users regarding the match between data requested and data provided.

Figure 8A:
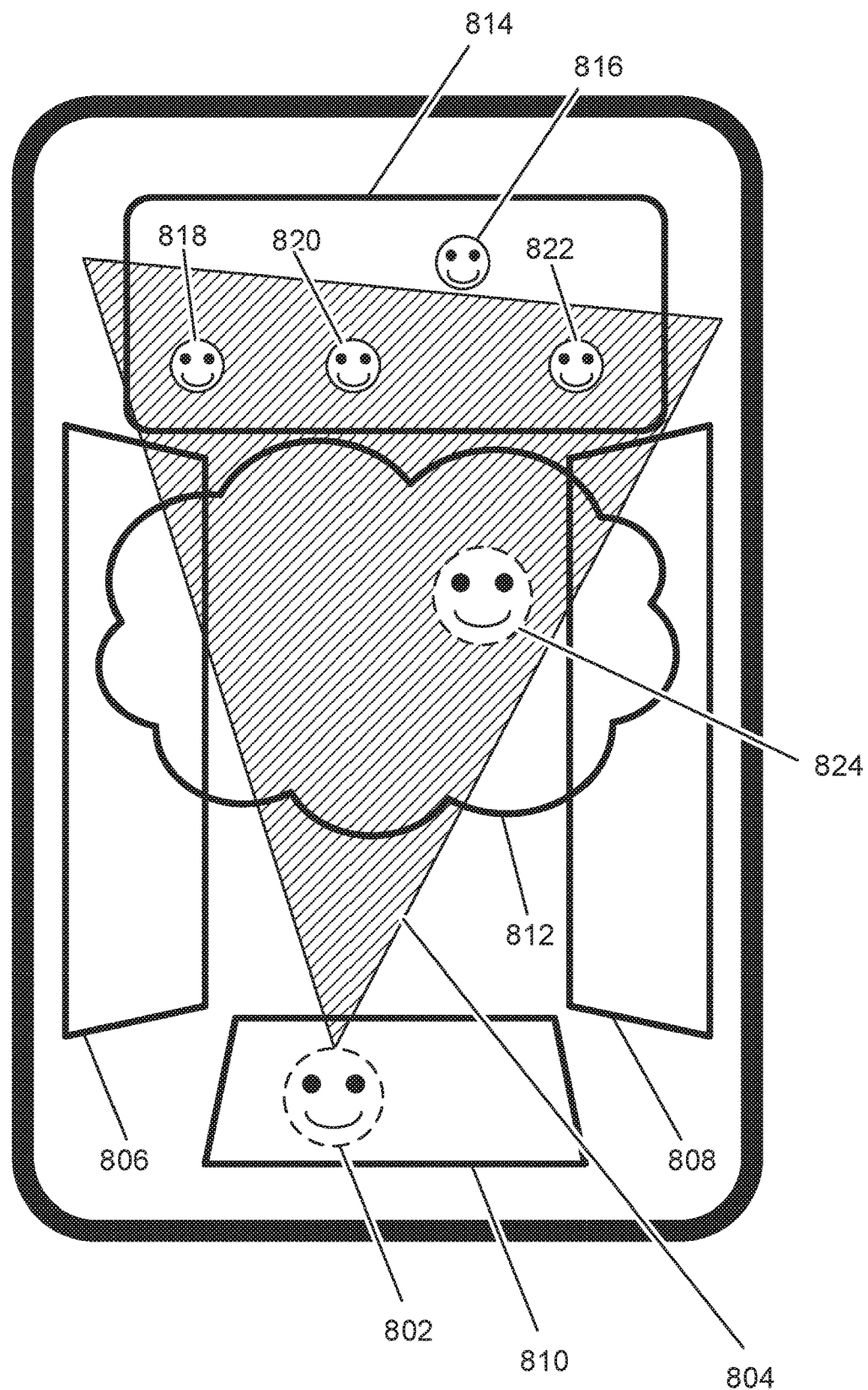
FIG. 8A is a schematic illustration showing an example real-world event site according to some embodiments.

FIG. 8A is a schematic illustration showing an example real-world event site according to some embodiments. FIG. 8A shows an example event venue site 800. The current data provider 802 is shown as a large smiley face at the bottom of the event venue site 800 within the rear crowd section 810. Left and right crowd sections 806, 808 are also located within the event venue site 800. The current data provider 802 may be a 360-degree live camera with a virtual view 804 of the event. For the example shown in FIG. 8A, the current data provider 802 has a position located at the rear of the event venue site 800. A second data provider 824 is located near the front of the floor section of the crowd. A geometric region 812 associated with a sensor-derived metric value range is shown encircling the second data provider near the front of the crowd. Additional camera views are available from cameras 816, 818, 820, 822 attached to the musicians on the stage 814.

For some embodiments, a VR device may send to a server a request corresponding to a virtual view associated with a camera position at an event site. The server may send to the VR device information for rendering the virtual view associated with the camera position at the event site, such as the event site 800 shown in FIG. 8A. The information sent by the server may include video information from a camera at the camera position, and region information regarding a geometric region of the event site. A geometric region may include a section of the stands or a section of the crowd at the event site, for example, such as the left, right, and rear sections 806, 808, 810 shown in FIG. 8A. For some embodiments, the region information may include a metric determined from sensor readings of a sensor located in a geometric region. For some embodiments, the region information may include meta data associated with a user located in a geometric region. For some embodiments, a VR device may render and display a video stream of a virtual view associated with a camera position at an event site. The VR device may generate and display a map as an overlay on the video stream for a map that is generated based on the region information. For example, the map may indicate crowd excitement that is determined by segmenting crowd loudness levels into intervals. For example, crowd loudness levels may be segmented into three or more intervals. A map may be generated that overlays the video stream with a color for regions of the event site associated with a particular loudness level interval. For some embodiments, a VR device may send to a server a request corresponding to a second virtual view associated with a second camera position at the event site. The server may send to the VR device information for rendering the second virtual view associated with the second camera position at the event site. The second set of information sent by the server may include video information from a camera at the second camera position, and region information regarding a second geometric region of the event site.

Figure 8B:
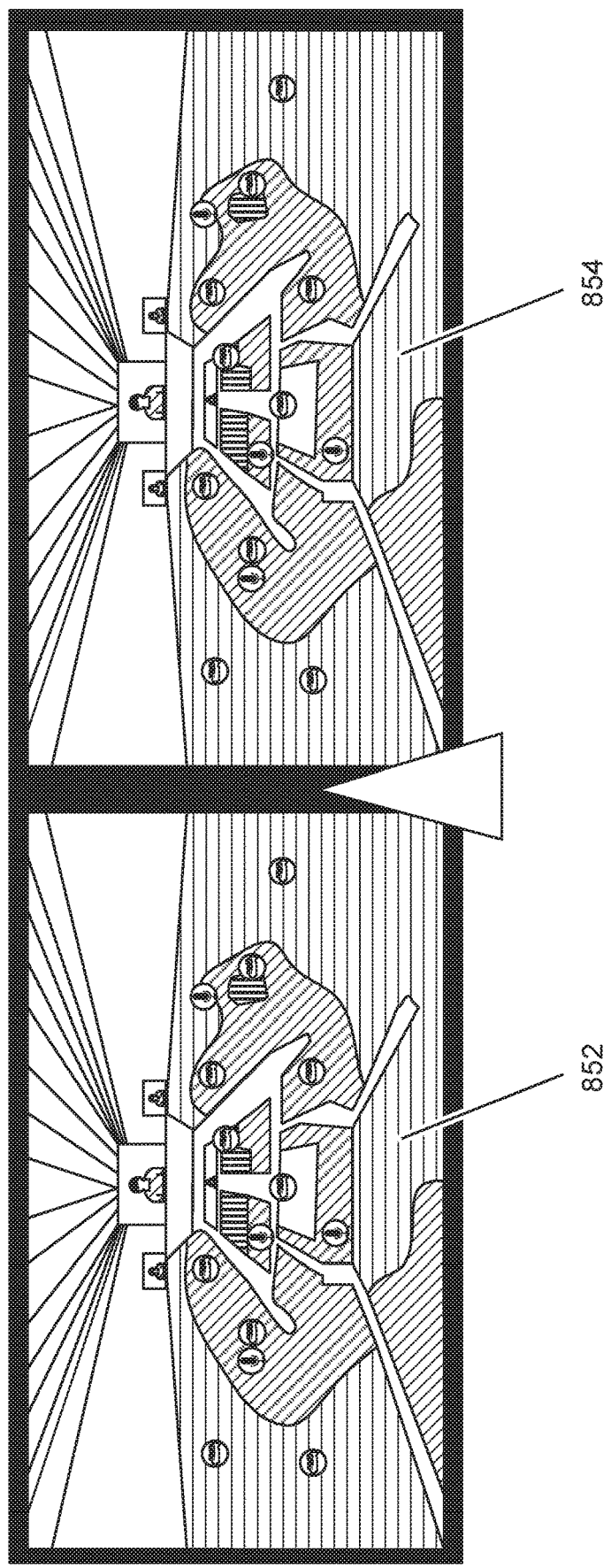
FIG. 8B is a schematic illustration showing an example stereoscopic HMD displaying VR content related to an event according to some embodiments.

FIG. 8B is a schematic illustration showing an example stereoscopic HMD displaying VR content related to an event according to some embodiments. FIG. 8B shows two displays 852, 854 visible inside a head mounted display 850. For some embodiments, the event shown in FIG. 8A may correlate to the VR content shown in the example stereoscopic HMD of FIG. 8B. Each display 852, 854 is displaying a VR-event map with locations of data providers and crowd excitement indicated for sections of the crowd. For some embodiments, a first and a second video stream may be displayed on virtual reality displays. For example, the first and second video streams may be displayed in a VR environment for some embodiments. The first and second video streams may be displayed, for some embodiments, on one or more virtual displays within a VR environment. For some embodiments, the first and/or second video stream may be a live stream of an event.

Figure 9:
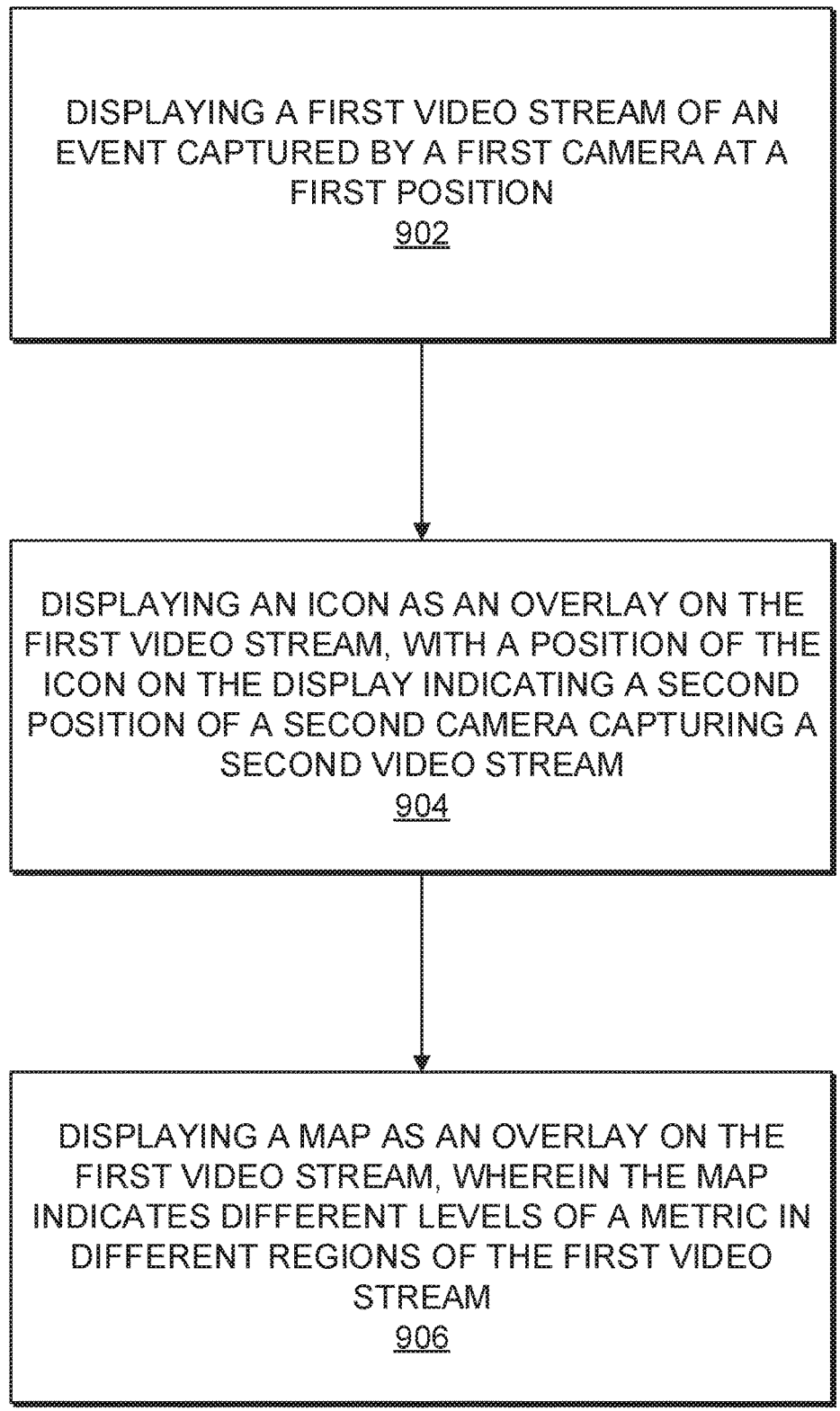
FIG. 9 is a flowchart illustrating a method for displaying an excitement map overlay according to some embodiments.

FIG. 9 is a flowchart illustrating an example method for displaying an excitement map overlay according to some embodiments. For some embodiments, a method 900 may include displaying 902 a first video stream of an event captured by a first camera at a first position. The method 900 may further include displaying 904 an icon as an overlay on the first video stream, with a position of the icon on the display indicating a second position of a second camera capturing a second video stream. The method 900 may also include displaying 906 a map as an overlay on the first video stream, wherein the map indicates different levels of a metric in different regions of the first video stream. For some embodiments, the map may be an excitement map, and the metric may be a measure of crowd excitement. An excitement map may include an overlay that colors different portions of a video stream with colors corresponding to levels of crowd excitement, such as green for areas of low excitement, yellow for areas of medium excitement, and red for areas of high excitement. Some embodiments may use different patterns for an excitement map, such as horizontal lines for areas of low excitement, diagonal lines for areas of medium excitement, and vertical lines for areas of high excitement. Some embodiments may use different colors, patterns, or other methods for identifying areas with different levels of crowd excitement. Some embodiments may identify different numbers of quantization levels for crowd excitement, such as just two levels or more than three levels.

Use Cases

On the date of an event (for example, the Pope's speech to a crowd in Philadelphia), the information marketplace collects the relevant data from the available data sources. Through the use of information models and, if used, a subsequent content analysis, the marketplace identifies, based on different approaches, the 30 seconds that excited the crowd the most by analyzing several data sources; determines, which video streams and audio streams offer the best quality for the identified time spans; and creates "ready-to-publish" videos based on the given time spans and best fitting video/audio streams. As a result of a semantic query, the marketplace presents a number of ready-to-use video streams which show the 30 seconds of a speech that excited the crowd the most and offers them to a news producer. The data is annotated and contains meta data that allows a news producer to choose a data set.

The data consumer enters a data query at the information marketplace for which he or she wants to obtain data. A data query may include the time and location of the event. The data consumer has an information marketplace account, and the data consumer may communicate his or her data query as an information model. Data providers have their registered devices indicated in their information marketplace account, along with an information model that indicates the data that the devices may collect.

The data consumer receives a video of the 30 seconds of the Pope's speech that excited the crowd the most. With a complete video, a data consumer is able to view accompanying data, including the data sources used as well as enrichment steps and services.

One embodiment of a process flow may include the following processes. The data consumer enters his data query which may include the place and time of the event. The marketplace guides the data consumer through a process of specifying the information for which he or she is looking. The information marketplace may use a query analyzer for understanding the users query and matching it to the information models of data that already is stored on the marketplace as well as the information models of registered devices and the data these could collect. The marketplace may assess the degree of similarity between the information models of historic data, the registered devices, and the user query. The information marketplace may predict the availability of the requested information based on historic data and the probability of devices being able to collect the data at the specified time and location, including stationary (e.g., microphones in a stadium and weather cameras) and mobile devices (analyzing use patterns for to determine an option for a virtual presence location).

The information marketplace may generate a first estimation of the availability of the requested data to the data consumer. Users of the information marketplace may have an inducement agreement with data providers who have a device registered that is able to collect the requested data according to an accompanying information model and who are able to collect the requested data at the given time and location. The data providers may confirm that they will visit the event (in case of mobile devices) or that a stationary device will be available on a particular day to provide the requested data for the negotiated inducement. The information marketplace may send notification to the data consumer about the expected availability of the requested information, consistently updating the information by considering the results of the negotiation as described in the step above.

Just before the event, the information marketplace may check availability of the identified data sources, confirming that the expected devices are at the location of the event and searching for additional data sources. After confirming the availability, the information marketplace may send a request to the data providers' devices in the area to start collecting data. If a data providers device is not set to automatically confirm a data request, a data provider manually confirms the request and chooses which data to provide. To allow data sources without an Internet connection to provide data and to reduce the data volume for mobile devices, the marketplace may organize participating devices into a content delivery network using devices with a stable and/or high-capacity data connection as central area network access points. The devices start collecting the requested data and uploading the data to the marketplace via the device's network connection or the marketplace's content delivery network.

The information marketplace may continually monitor and analyze incoming data; filtering available data from the devices in accordance with the data consumer's query and the resulting information model; analyzing how well the incoming data matches the requested result queried by the user; requesting additional data sources and/or giving advice for enhancing data quality; continually informing the user about the currently available quality for the requested information; and conducting a supportive data analysis (e.g., determining if there are sub-groups that react differently to an event or similar available data from other events) to create additional data that may be of interest for data consumers.

The information marketplace may aggregate the selected data into a single data source (e.g., adding video streams with additional camera angles or higher quality audio streams). At the end of the event, the information marketplace analyzes the collected data and identifies the most exciting part by analyzing collected data (such as video data audio data, data from wearables, and smartphone sensor data). This analysis may have several different results depending on the analytical approach/model for determining the most exciting portions of the collected data.

The information marketplace may send to the data consumer a ranked list of video streams (considering the different analytical approaches/models) and accompanying data (e.g., analytical results), along with meta information about available data (including price and data quality/value). The data consumer may select and purchase a video or data stream. During purchasing, the data consumer may select the format of the purchase. If available, the user may transform the format of the purchased data.

The information marketplace may provide the data consumer with access to the requested data. In cases where the user requests live information, the purchase may be a data stream accessed by a marketplace API or by a messaging protocol, such as Internet of Things connectivity protocols Message Queuing Telemetry Transport (MQTT) or Advanced Message Queuing Protocol (AMQP). In cases, where the user requested aggregated information over a longer time period, the result will be a batch that can either be downloaded or accessed via a given API. After receiving the data, a data consumer device uses the data to display a VR environment.

For some embodiments, the data consumer may enter his query retroactively after the end of the event. For one embodiment, the data consumer may select the individual data sources. For one embodiment, the marketplace analyzes what matching data is stored on the marketplace. For one embodiment, the marketplace determines if client devices collected additional data not yet uploaded to the marketplace. The client devices may store such data on a device in a pre-negotiated (e.g., during device registration) area that is reserved by the marketplace and offered to a data consumer. In this case, client devices and the marketplace may provide short-term storage and long-term storage, respectively. The client devices may store the data only for a limited time, with the user choosing the amount of storage capacity allocated to a data collector. The marketplace may store data for a long time, only deleting the data if requested by a data provider or if the data becomes irrelevant or out of date. While a device may collect more data than requested by the marketplace, a device stores such data on the device in a pre-negotiated (e.g., during device registration) area that is reserved by the marketplace. The storage space reserved by the marketplace on the device may be limited, but the marketplace may have short-term access to the data. If another data consumer issues a query for the data, the marketplace may access short-term memory on the device, collect the data, and add the data to the marketplace's long-term memory storage.

While the methods and systems in accordance with some embodiments are discussed in the context of virtual reality (VR), some embodiments may be applied to mixed reality (MR)/augmented reality (AR) contexts as well. Also, although the term "head mounted display (HMD)" is used herein, some embodiments may be applied to a wearable device (which may or may not be attached to the head) capable of, e.g., VR, AR, and/or MR for some embodiments.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
    displaying a first video stream of an event captured by a first camera at a first position;
    displaying an icon as an overlay on the first video stream, with a position of the icon on the display indicating a second position of a second camera capturing a second video stream of the event;
    receiving data indicating levels of crowd excitement from user devices at the event;
    generating a map of a site of the event based on the data indicating levels of crowd excitement; and
    displaying the map of the site of the event as an overlay on the first video stream, wherein the map indicates different levels of a metric of activity occurring within different regions of the site of the event and the first video stream, wherein the metric of activity is crowd excitement.

2. The method of claim 1, further comprising, in response to receiving data indicating user selection of the icon, displaying the second video stream.

3. The method of claim 1, wherein receiving data comprises:
    collecting audio data from a plurality of audio sensors distributed throughout a crowd at the event,
    and
    wherein levels of crowd excitement are determined based at least in part on levels of crowd noise indicated by the audio data.

4. The method of claim 1, wherein receiving data comprises:
    collecting heart rate data from a plurality of heart rate sensors worn by a plurality of participants in a crowd at the event,
    and
    wherein levels of crowd excitement are determined based at least in part on heart rate levels indicated by the heart rate data.

5. The method of claim 1, wherein receiving data comprises:
    collecting movement data from a plurality of accelerometers worn by a plurality of participants in a crowd at the event,
    and
    wherein levels of crowd excitement are determined based at least in part on movement levels indicated by the movement data.

6. The method of claim 1, wherein receiving data comprises:
    collecting image data from a plurality of image sensors distributed throughout a crowd at the event,
    and
    wherein the levels of crowd excitement are determined based at least in part on image detection analysis of the image data.

7. The method of claim 1, further comprising:
    receiving meta data from a plurality of devices distributed throughout a crowd at the event,
    wherein the metric is determined based at least in part on the meta data.

8. The method of claim 1, further comprising:
    displaying the second video stream,
    wherein the first video stream and the second video stream are displayed as virtual reality displays.

9. The method of claim 1, wherein the first video stream and the second video stream are live streams of the event.

10. A virtual reality system comprising:
    a processor; and
    a non-transitory computer-readable medium storing instructions that, when executed by the processor, are operative to cause the processor to:
        display a first video stream of an event captured by a first camera at a first position;
        display an icon as an overlay on the first video stream, with a position of the icon on the display indicating a second position of a second camera capturing a second video stream of the event;
        receive data indicating levels of crowd excitement from user devices at the event;
        generate a map of a site of the event based on the data indicating levels of crowd excitement;
        display the map of the site of the event as an overlay on the first video stream,
        wherein the map indicates different levels of a metric associated with different regions of the site of the event and the first video stream, wherein the metric indicates a level of activity occurring in a respective region of the map, wherein the metric is crowd excitement.

11. The system of claim 10, wherein the instructions are further operative to cause the processor, in response to receiving data indicating user selection of the icon, to display the second video stream.

12. The system of claim 10, wherein receiving data comprises:
collecting audio data from a plurality of audio sensors distributed throughout a crowd at the event, and
wherein levels of crowd excitement are determined based at least in part on levels of crowd noise indicated by the audio data.

13. The system of claim 10, wherein the instructions are further operative to cause the processor to:
receive meta data from a plurality of devices distributed throughout a crowd at the event,
wherein the metric is determined based at least in part on the meta data.

14. The system of claim 10, wherein the instructions are further operative to cause the processor to:
display the second video stream,
wherein the first video stream and the second video stream are displayed as virtual reality displays.

15. The system of claim 10, wherein the first video stream and the second video stream are live streams of the event.

16. A method comprising:
displaying a first video stream of an event captured by a first camera at a first position;
displaying an icon as an overlay on the first video stream, with a position of the icon on the display indicating a second position of a second camera capturing a second video stream of the event;
receiving data from a plurality of sensors distributed throughout a crowd at the event;
generating a map of a site of the event based on the received data and associating different levels of a metric of activity occurring in different regions of the site of the event, wherein the metric is crowd excitement, and wherein the received data indicates levels of crowd excitement occurring within at least some of the different regions of the site of the event; and
displaying the map as an overlay on the first video stream, wherein the map indicates the different levels of the metric as associated with the different regions of the site of the event.

17. The method of claim 16, wherein at least some of the plurality of sensors comprise audio sensors that collect audio data, and wherein levels of crowd excitement are determined based at least in part on levels of crowd noise indicated by the audio data.

18. An apparatus comprising:
a processor; and
a non-transitory computer-readable medium storing instructions that, when executed by the processor, are operative to cause the processor to:
display a first video stream of an event captured by a first camera at a first position;
display an icon as an overlay on the first video stream, with a position of the icon on the display indicating a second position of a second camera capturing a second video stream of the event;
receive data from a plurality of sensors distributed throughout a crowd at the event;
generate a map of a site of the event based on the received data and associating different levels of a metric of activity occurring in different regions of the site of the event, wherein the metric is crowd excitement, and wherein the received data indicates levels of crowd excitement occurring within at least some of the different regions of the site of the event; and
display the map as an overlay on the first video stream, wherein the map indicates the different levels of the metric as associated with the different regions of the site of the event.

19. The apparatus of claim 18, wherein at least some of the plurality of sensors comprise audio sensors that collect audio data, and wherein levels of crowd excitement are determined based at least in part on levels of crowd noise indicated by the audio data.

\* \* \* \* \*